(12) United States Patent
Grochal

(10) Patent No.: US 7,955,430 B2
(45) Date of Patent: Jun. 7, 2011

(54) COATING MATERIAL

(75) Inventor: Peter Grochal, Waldshut-Tiengen (DE)

(73) Assignee: STO AG, Stuhlingen (DE)

( * ) Notice: Subject to any disclaimer, the term of this patent is extended or adjusted under 35 U.S.C. 154(b) by 596 days.

(21) Appl. No.: 10/599,950

(22) PCT Filed: Apr. 15, 2005

(86) PCT No.: PCT/EP2005/004033
§ 371 (c)(1),
(2), (4) Date: Nov. 13, 2006

(87) PCT Pub. No.: WO2005/100459
PCT Pub. Date: Oct. 27, 2005

(65) Prior Publication Data
US 2007/0157853 A1 Jul. 12, 2007

(30) Foreign Application Priority Data
Apr. 15, 2004 (DE) .......................... 10 2004 018 338

(51) Int. Cl.
C04B 14/00 (2006.01)
C04B 14/04 (2006.01)
C09C 1/04 (2006.01)
C09C 1/36 (2006.01)
C09C 1/22 (2006.01)

(52) U.S. Cl. ........ 106/481; 106/401; 106/426; 106/436; 106/446; 106/457; 106/459; 106/479; 106/490

(58) Field of Classification Search .................. 502/242, 502/248, 250, 253; 106/733, 401, 426, 436, 106/446, 457, 459, 479, 481, 490
See application file for complete search history.

(56) References Cited

U.S. PATENT DOCUMENTS

| 5,547,823 | A | * | 8/1996 | Murasawa et al. ............ 430/531 |
| 6,037,289 | A | * | 3/2000 | Chopin et al. .................... 502/2 |
| 6,048,910 | A | * | 4/2000 | Furuya et al. ................... 522/86 |
| 6,063,849 | A | | 5/2000 | Morris et al. |
| 6,337,129 | B1 | * | 1/2002 | Watanabe et al. ............ 428/328 |
| 2002/0172773 | A1 | | 11/2002 | Ghosh et al. |
| 2004/0204314 | A1 | * | 10/2004 | Escaffre et al. ............... 502/242 |
| 2005/0277543 | A1 | * | 12/2005 | Takahashi et al. ............ 502/100 |

FOREIGN PATENT DOCUMENTS

| CN | 1439041 A1 | | 8/2003 |
| EP | 0 916 411 A1 | | 5/1999 |
| EP | 2000502 A1 | | 12/2008 |
| WO | WO/99/51345 | * | 10/1999 |
| WO | WO 00/06633 | | 2/2000 |
| WO | WO 00/39049 | | 7/2000 |
| WO | WO/03/102091 | * | 12/2003 |

OTHER PUBLICATIONS

Abstract of Japanese Patent Publication 2001-040291, Sengoku et al., "Photocatalytic colored Article and Colored Primer Coating Material Composition for the Coating", published Feb. 2001.*
Paints and varnishes—Evaluation of degradation of paint coatings; Designation of intensity, quantity and size of defect—Part 6 Rating of degree of chalking by tape method (ISO 4628-6:1990); German version EN ISO 4628-6:2001.
Paints and varnishes—Natural weathering of coatings—Exposure and assessment (ISO 2810:2004); German version EN ISO 2810:2004.
Paints and varnishes—Evaluation of degradation of coatings—Designation of quantity and size of defects, and of intensity of uniform changes in appearance—Part 6: Assessment of degree of chalking by tape method (ISO/DIS 4628-6:2005); German version prEN ISO 4628-6:2005.
Joanna Phillips, Die Verwendung von Titanweiss In Der Retusche, Source: Zeitschrift fur Kunsttechnologie und Konservierung, 2002, pp. 193-215, ISSN: 0931-7198; Location in the IRB-Library: DEIRB Z 1704, Germany.
Stratakis et al., "Laser structuring of water-repllent biomimetic surfaces", 2009, 3 pages, SPIE.

* cited by examiner

Primary Examiner — Timothy M Speer
Assistant Examiner — Jonathan C Langman
(74) Attorney, Agent, or Firm — Schwabe, Williamson & Wyatt, P.C.

(57) ABSTRACT

A coating material comprising a binding agent and at least one filler including particles having a size and/or surface roughness of about 100 μm or less, and a photocatalytically active agent. The binding agent may be at least partially decomposed by a photocatalytic action, and a microstructured, self-cleaning surface may be formed.

27 Claims, No Drawings

COATING MATERIAL

CROSS REFERENCE TO RELATED APPLICATIONS

The present application claims priority under 35 U.S.C. §120 to International Patent Application No. PCT/EP2005/004033, filed Apr. 15, 2005, entitled "Coating Material" and International Priority under 35 U.S.C. §119 to co-pending German Patent Application No. 10 2004 018 338.4, filed Apr. 15, 2004, entitled "Beschichtungsmaterial;" the entire contents and disclosures of which are hereby incorporated by reference in their entirety.

TECHNICAL FIELD

Embodiments of the invention relate to a coating material comprising a binding agent and a filler including particles having a size of less than about 10 µm (micrometer) and/or a surface roughness of less than about 10 µm, and the use thereof for coating facades and other parts of buildings.

BACKGROUND

Coating materials may be used for visual or construction physics-related reasons to coat facades and other construction surfaces. But the fact that the cleaning of the surfaces coated with such coating materials is often difficult and costly has turned out to be a problem. For this reason, efforts have been made for a long time to look for ways of creating self-cleaning designs of the surfaces of the areas coated with such coating materials.

In conjunction with the implementation of self-cleaning surfaces, coating materials on the basis of mineral paints, which are subject to constant decomposition on the surface, have been known for a long time. Due to this process, also known as "chalking," the surfaces regenerate constantly and dirt adhering to them is removed in the process of the decomposing coating. But these surfaces have the disadvantage that the irregular and, in some cases, complete decomposition of exposed areas results in patchy surfaces and that the chalking not only causes the rapid decomposition of the coating and, accordingly, shortened restoration intervals, but that also, upon contact with the coated surface, the materials touching it (e.g. clothing) are soiled with the decomposition products of the coating.

In addition to the self-cleaning coating materials based on mineral paints, self-cleaning coating materials having the form of silicone resin paints have also become known. Silicone resin paints form a hydrophobic surface which is barely moistened by precipitation water. Dirt particles are washed off the surface by the water draining off. But with such coating materials, it has proven to be a problem that the hydrophobicity required for the achievement of the self-cleaning properties is not fully developed until after weathering has taken place for several months, for that is the time it takes for the rain to completely wash out the water-soluble components contained in the coating material.

But that leads to the possibility of increased soiling taking place within the first few months of the completion of the coating. Such a tendency for soiling is particularly observed following a long periods of dry spells, after which large quantities of dirt particles and pollutants are in the atmosphere and are absorbed by the precipitation water. The dirt particles are deposited on the surfaces capable of being moistened and result in an impairment of the appearance of the facades and other soiled surfaces onto which they are deposited.

In WO 00/39049, the creation of self-cleaning surfaces using coating materials of the kind described above is described. The coating materials described in this publication contain fillers exhibiting an at least bimodal particle size distribution, using, on the one hand, particles having a particle size of at least 5 µm and, on the other hand, particles having a particle size of max. 3 µm. The use of such coating materials has the effect that soiled rain water runs off the surface of an object and that dust particles deposited on the surface are pulled along by the water drops rolling off. In addition, the use of the coating materials described in the publication named above results in a permanently dry facade due to the running off of the rain water achieved by the use of the special fillers. This enables the prevention of damage due to moisture, especially on the weather sides of the facades. Furthermore, the achieved drying of the facades deprives microorganisms of an important element of their basic living conditions, namely water, allowing facade surfaces obtained by using the known coating materials to be protected from infestation with fungi, algae, lichens etc. in a natural manner, i.e. without the addition of biocides. A coating material comparable to the coating materials known from WO 00/39049 is also described in EP 0 772 514 B1. With the coating material described in this publication, a self-cleaning surface is obtained by producing a surface structure having elevations spaced apart 5 to 200 µm, using hydrophobic polymers or permanently hydrophobized materials, while making sure that the elevations are not capable of being detached by water or water containing detergents. This microstructure of the surface produces a self-cleaning property which is due to a so-called super hydrophobicity, caused by special microstructures. This property has become known as the "Lotus effect."

According to the publication named above, the desired surface structure can be obtained by an after-treatment of the surface, such as e.g. stamping, etching, milling or covering of the surfaces with dust, with it being required to ensure, in every case, that the thus obtained elevations cannot be removed by water or water containing detergents. The self-cleaning surface structure described in the publications mentioned above may be obtained on smooth surfaces as well as by using special sprays.

In WO 00/06633, coating materials for plastics based on inorganic binding agents and fillers are described. The coating materials set forth in the known publication may additionally contain photocatalytically active agents for self-cleaning by means of decomposition of organic soiling and superhydrophilics, while the binding agents used in the manufacture of the known materials are stable to the photocatalytic effect of the photocatalytically active agents.

In EP 0 916 411 A1, a coated product with a first coating layer and a second coating layer containing a photocatalytically active agent is described. The combination of two layers described in the above-mentioned publication produces a photocatalytically self-cleaning surface which is not even degraded by the photocatalytic action.

When using the coating materials known from EP 0 772 514 B1 and WO 00/39049, such as e.g. the sprays described for smooth surfaces, it turned out, however, that the originally observed outstanding self-cleaning properties can not be maintained permanently, even when, as emphasized in EP 0 772 514 B1, it is carefully made sure that the microstructure cannot be detached by water or water containing detergents.

SUMMARY OF THE INVENTION

In summary, disadvantages of previously-discussed applications of self-cleaning surfaces may be overcome by embodiments of the present invention through nanotechnology producing the lotus effect and photocatalysis. In various embodiments, the lotus effect of a surface having a micro/nano structure may have the effect of the contact area of water becoming extremely small and the energy interaction between water and the surface falling under 1%. The durability of such a coating may be improved in accordance with various embodiments by adding nanoscaled particles, such as e.g. nanogels based on silica, to the coating material used for the creation of this coating structure, with said particles renewing the effective surface structure over and over again in the process of the continued weathering of the surface. In embodiments, photocatalysis may be enlisted, taking advantage of the insight that innumerable virtual nanoscaled surface layers may already be present in a layer of a coating material having a thickness of only about 150 µm due to the addition of nanoscaled fillers, so that the weathering of an external surface layer may result in another surface layer to result. In this process, the binding agent surrounding the nanoscaled fillers according to embodiments is decomposed, which may result in another nanostructure forming the surface.

DETAILED DESCRIPTION

In view of these problems in the state of the art, various embodiments of the present invention are based on the problem of providing coating materials of the kind described above, whose self-cleaning properties are permanently maintained when they are exposed, from time to time, to rain, moving water or mechanical loads, such as wind.

Reference in the specification to "one embodiment," "embodiments," or "an embodiment" means that a particular feature, structure, or characteristic described in connection with the embodiment is included in at least one embodiment of the invention. The appearances of the phrase "in one embodiment" in various places in the specification do not necessarily all refer to the same embodiment, but it may. The phrase "A/B" means "A or B." The phrase "A and/or B" means "(A), (B), or (A and B)." The phrase "at least one of A, B, and C" means "(A), (B), (C), (A and B), (A and C), (B and C), or (A, B, and C)." The phrase "(A) B" means "(A B) or (B)", that is, "A" is optional.

According to embodiments of the invention, previously-discussed problems may be addressed by a coating material including a binding agent which may be at least partially catalytically degradable and further including at least one catalytically active agent.

In order to prevent the undesired chalking which occurs with the known coating materials based on mineral paints, embodiments of a coating material may be advantageously chosen such that the photocatalytic decomposition of the binding agent is equivalent to or below chalking level 1 in accordance with Deutsches Institut für Normung e.V. Europäische Norm International Organization for Standardization (DIN EN ISO) 4628, *Paints and varnishes—Evaluation of degradation of paint coatings—Designation of intensity, quantity and size of common types of defect—Part 6: Rating of degree of chalking by tape method*, (DIN EN ISO 4628-6: 2001) (English publication February 2002). In embodiments, persistence of the desired self-cleaning properties may be enhanced by reducing the thickness of a layer of the coating material by about 0.1 µm or more, preferably about 1 µm or more, per year by a photocatalytic decomposition of the binding agent when the coating material is used as an external coating, given exposed weathering pursuant to DIN EN ISO 2810, *Paints and varnishes. Natural weathering of coatings. Exposure and assessment*, (DIN EN ISO 2810:2004) (English publication October 2004), when the sample is vertical and the face of the sample is oriented in the direction of the equator.

Various embodiments may be advantageous over other coating materials that lose self-cleaning properties resulting from the impairments of the surface structure due to detachment of surface particles in the event of contact with water and/or detergents, which were mentioned in EP 0 773 514 B1, as well as changes in the surface structure caused by mechanical loads. These loads, caused, for example, by particles carried along with the air, can cause damage of the microstructure of facade surfaces which brings about the loss of the self-cleaning properties.

Coating materials in accordance with embodiments may result in automatic regeneration of surfaces damaged in such a way by the constant generation of new microstructures due to the catalytic decomposition of binding agent layers in between the filler particles. Based on the use of filler particles having a size and/or surface roughness in the range of less than about 100 µm, these newly produced surface structures may also exhibit a desired super-hydrophobicity, allowing the formation of surfaces which may be capable of exhibiting persistently self-cleaning properties. Here, removal of surface layers, which precisely had to be avoided in accordance with EP 0 772 514 B1, may be taken advantage of in view of the preservation of the desired properties if the coating material exhibits particles having the desired surface structure or particle size.

Decomposition, by catalytic action, of binding agents occurring during the use of coating materials according to various embodiments of the invention may avoid problems occurring with the mineral paints described above, because the speed of the catalytic decomposition of the binding agent may be controlled by the use of suitable catalytically acting agents so that an accumulation of decomposition products causing visible soiling does not occur due to the fact that these decomposition products are washed off in sufficient amounts and/or volatile materials are produced in the course of the catalytic decomposition, with said volatile materials not being deposited on the self-cleaning surface in the first place. In embodiments, the speed required to achieve the desired regeneration of the surfaces may be set in such a way, according to the selected particle size and/or surface roughness, that the catalytic decomposition of the binding agent does not result in shortened restoration intervals.

Overall, the use of the coating materials according to various embodiments may achieve sufficient resistance to weathering despite the automatic regeneration of surfaces. In embodiments, resistance to weathering of coating materials, such as paintwork, may include a property of being able to withstand external influences of the weather that destroy the coating, such as light, UV radiation, temperature, oxygen, moisture and/or water. With conventional coating materials, resistance to weathering is achieved by subjecting coating components to which a photocatalytic action is attributed, such as titanium dioxide pigments, to a surface treatment in order to reduce the photocatalytic activity. In this way, highly stabilized pigments with excellent protective effect for coating materials are obtained with conventional coatings. Due to the remaining photocatalytic activity of these known materials, the layer thickness is reduced so slowly that it takes many years of external weathering for a reduction of the layer thickness by just a few µm to be observed.

The coating material according to embodiments of the invention differs from these known materials in that the addition of a highly photocatalytically active agent may produce a desired binding agent decomposition, with the speed of decomposition being set in such a way, by way of the selection of the binding agent and the photocatalytically active agent, that it is greater than the speed of decomposition of conventional materials with surface-treated photocatalytically active agents, but remains low enough that the undesired chalking may be avoided.

With respect to the desired adjustability of the speed of decomposition and/or the properties of the decomposition products, in embodiments, it may be especially advantageous to include a binding agent that is at least in part photocatalytically degradable and to further include a catalytically active agent that has at least one photocatalytically active metal oxide.

In embodiments, a photocatalytically degradable binding agent may include an aqueous polymer dispersion, a polymer dispersion that is redispersible in water, a hydrophobic resin and/or a preliminary resin product.

In embodiments, a photocatalytically active agent may comprise a photocatalytically active metal oxide. In some of these embodiments, a desired decomposition property may be achieved by including a photocatalytically active agent. A photocatalytically active agent may comprise an oxide of a selected one or more of titanium, zinc, iron, manganese, molybdenum, and tungsten. In a preferred embodiment, the selected oxide(s) may comprise at least 60 weight percent of the total quantity of the catalytically active agent. In another preferred embodiment, the selected oxide(s) may comprise at least 80 weight percent of the total quantity of the catalytically active agent. In yet another preferred embodiment, the selected oxide(s) may comprise at least 90 weight percent of the total quantity of the catalytically active agent. In various embodiments, further adjustability of the catalytic properties and the generated decomposition products may be achieved if the catalytically active agent includes at least one additive selected from C, N, S, and the group consisting of Pt, Rh, Mn, Cr, Ru, Ni, Pd, Fe, Co, Ir, Cu, Mo, Zr, Re, Ag, and Au in the form of their oxides and/or halogenides. In various ones of these embodiments, the selected additive(s) is in ionic form. In various embodiments, the selected additive(s) preferably comprise 40 weight percent or less of the total weight of the catalytically active agent. In preferred ones of these embodiments, the selected additive(s) comprise 20 weight percent or less of the total weight of the catalytically active agent. In preferred ones of the embodiments, the selected additive(s) comprise 10 weight percent or less and more than 1 weight percent of the catalytically active agent. In still other preferred ones of the embodiments, the selected additive(s) comprise more than 2.5 weight percent, and in some cases, 5 weight percent or more, of the total weight of the catalytically active agent. In various embodiments, the selected additive(s) may enable the stimulation of the catalytic property even with wave lengths e.g. in the visible range of the solar spectrum, ensuring the functioning of the coating even on the northern sides of a building, which face away from the sun. In embodiments, photocatalyzers that are suitable for the decomposition of organic materials may be one or more of those described in DE 197 57 496 A1. The disclosed content of this publication with respect to the structure and composition of photocatalyzers is included here by explicit inclusion into this description.

In embodiments, the use of photocatalytically degradable binding agents in conjunction with photocatalytically active metal oxides may be especially advantageous that a self-renewing surface with lotus effect properties is obtained, with the self-cleaning being supported by an additionally occurring photocatalytic decomposition of organic soiling.

In embodiments, particularly favorable self-cleaning properties may be achieved if the catalytically active agent comprises a selected one of zinc sulfide, zinc oxide, and titanium dioxide, preferably in partially crystalline form or in the form of anatase.

Coating materials in accordance with embodiments may comprise a filler. In various ones of these embodiments, especially favorable self-cleaning properties may be achieved if the filler includes particles having a size and/or surface roughness of about 10 μm or less. In exemplary ones of these embodiments, the filler may include particles having a size and/or surface roughness of about 1 μm or less. In certain preferred embodiments, the filler may include nano-fillers in the form of highly-disperse silica because outstanding hydrophobicity may obtained. In embodiments, the coating material comprises less than 60 weight percent, preferably less than 40 weight percent, and especially preferably less than 30 weight percent fillers with the desired particle size and/or surface roughness.

In embodiments, the desired self-cleaning properties may advantageously be achieved if the coating material is formulated using an excess of binding agent. Layers according to various embodiments may consist of subcritical or critical formulations, which are characterized in that the contained filler consists at least partially of a nano particle, such as e.g. highly-disperse silica. Those skilled in the art may understand a critical or subcritical formulation to be a formulation in which possibly existing pigments, fillers and possible gaps are completely surrounded and/or filled by the binding agent. In embodiments, the surface of the coating material or the film surface obtained by using such coating materials is formed in the dried and hardened state of a closed layer of binding agents and fillers/pigments, the formed surface of a coating not yet exhibiting self-cleaning properties. According to various embodiments, adding photocatalytically active metal oxides, such as the highly porous photocatalyzers described in DE 197 57 496, for the utilization of visible light or, in the simplest form, also using zincsulfide, zinc oxide or titanium dioxide, preferably in partially crystalline form or in the form of anatase, the binding agent film may be decomposed, starting at the outer layer of the external surface, due to the decomposition of organic components, catalytically induced by the effect of daylight or UV light. This degradation of binding agents may expose the nano fillers, which may form a micro surface structure with hydrophobic properties. In embodiments, it may be advantageous for combinations of polymer dispersions and nano particles, such as e.g. highly disperse silica gels, so-called nano composites, to be used. In embodiments of nano composites, the nano particles may accumulate on the surface of the polymer dispersion particles following the degradation of binding agents.

In embodiments, the photocatalytic decomposition not only of the binding agent, but also of any organic dirt particles that might be on the surface, may produce a significantly more effective and permanent self-cleaning function as compared to the state of the art. In embodiments, the surface of the coating material is constantly renewed due to the constantly occurring decomposition of binding agents, and the decrease of the self-cleaning properties due to the loss of the microstructure is reliably prevented.

In embodiments, the photocatalytically-induced decomposition may be, however, highly reduced compared to the chalking surfaces described above, so that the disadvantages applicable to the chalking surfaces can be avoided.

Contrary to the coating material proposed in WO 00/39049, the coating material according to various embodiments may include a filler with a monomodal particle size distribution with a mean particle diameter of about 10 µm or less. In some embodiments, the mean particle diameter may be about 1 µm or less. In certain preferred embodiments, the mean particle diameter may be about 0.1 µm or less.

In accordance with a preferred embodiment, the coating material comprises about 10 to 30 weight percent, specifically about 20 weight percent of a photocatalytically degradable binding agent, 2 to 30 weight percent, specifically about 5 to 15 weight percent, and especially preferably about 10 weight percent of a filler having a mean particle size of about 1 µm or less, specifically about 0.1 µm or less, such as nanoscaled silica, about 2 to 15 weight percent, specifically about 3 to 8 weight percent, especially preferably about 5 weight percent of a photocatalytically active pigment, such as $TiO_2$ including, if necessary, C, N, and/or S, as well as optionally about 0.01 to 0.1 weight percent, specifically about 0.05 weight percent of a pigment distributor, about 0.1 to 1 weight percent, specifically about 0.3 weight percent of a thickener, about 5 to 3 weight percent, specifically about 10 to 20 weight percent of another filler, such as e.g. a fine quartz filler, about 10 to 20 weight percent, specifically about 15 weight percent of a pigment, about 2 to 8 weight percent, specifically about 6 weight percent of a hydrophobization agent, up to about 4 weight percent of a solvent, up to about 0.8 weight percent of a preservative and/or up to about 35 weight percent of water. A preferred exemplary formulation of coating materials according to various embodiments is presented below in Table 1.

TABLE 1

|  | Weight Percent |
| --- | --- |
| Water | 26.6 |
| Pigment distributor | 0.05 |
| Thickener | 0.3 |
| Binding agent | 20 |
| Quartz filler, fine | 15 |
| Nanoscaled silica | 10 |
| Pigment $TiO_2$ | 15 |
| Photocatalytic pigment | 5 |
| Hydrophobization agent | 6 |
| Solvent | 2 |
| Preservative | 0.05 |
| TOTAL: | 100.00 |

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

The invention claimed is:

1. A coating material for coating facades and other building surfaces with a self-cleaning and self-regenerating surface, the coating material comprising:
a binding agent in an amount of about 10 to about 30 weight percent of the coating material, the binding agent comprising silicone or silicate;
at least one filler in an amount of about 2 to about 30 weight percent of the coating material, the at least one filler including particles having a size and/or a surface roughness of about 10 µm or less;
a photocatalytically active agent in an amount of about 2 to about 15 weight percent of the coating material; and
the coating material further comprising between about 0.1 and about 1 weight percent of a thickener; between about 5 and about 30 weight percent of another filler; between about 10 and about 20 weight percent of a pigment; between about 2 and about 8 weight percent of hydrophobization agent; about 4 weight percent or less of a solvent; about 0.8 weight percent or less of a preservative; and about 35 weight percent or less of water;
wherein the binding agent is capable of decomposing due at least in part by a photocatalytic action of the photocatalytically active agent to form a microstructured, self-cleaning surface that photocatalytically reduces by about 0.1 µm or more per year in response to external weathering as per Deutsches Institut für Normung e.V. Europäische Norm International Organization for Standardization (DIN EN ISO) 2810, the decomposition being equivalent to chalking level 1 or less as per DIN EN ISO 4628-6.

2. The coating material of claim 1, wherein the microstructured, self-cleaning surface photocatalytically reduces by about 1 µm or more per year in response to external weathering as per DIN EN ISO 2810 (when sample is vertical and face of sample is oriented in direction of equator).

3. The coating material of claim 1, wherein the binding agent is at least partially photocatalytically degradable and the photocatalytically active agent comprises at least one photocatalytically active metal oxide.

4. The coating material of claim 1, wherein the binding agent comprises a nano-composite material including one or more of an aqueous polymer dispersion capable of being redispersed in water, a hydrophobic resin, and a preliminary resin product.

5. The coating material of claim 1, wherein the photocatalytically active agent includes one or more oxides of titanium, zinc, iron, manganese, molybdenum, and tungsten.

6. The coating material of claim 5, wherein the photocatalytically active agent includes about 60 weight percent or more of the one or more oxides, relative to a total weight of the photocatalytically active agent.

7. The coating material of claim 6, wherein the photocatalytically active agent includes about 80 weight percent or more of the one or more oxides, relative to a total weight of the photocatalytically active agent.

8. The coating material of claim 7, wherein the photocatalytically active agent includes about 90 weight percent or more of the one or more oxides, relative to a total weight of the photocatalytically active agent.

9. The coating material of claim 1, wherein the photocatalytically active agent active agent comprises at least one additive selected from the group consisting of C, N, S, oxides of Pt, Rh, Mn, Cr, Ru, Ni, Pd, Fe, Co, Ir, Cu, Mo, Zr, Re, Ag, and Au, and halogenides of Pt, Rh, Mn, Cr, Ru, Ni, Pd, Fe, Co, Ir, Cu, Mo, Zr, Re, Ag, and Au.

10. The coating material of claim 9, wherein the photocatalytically active agent includes about 40 weight percent or less of the at least one additive, relative to a total weight of the photocatalytically active agent.

11. The coating material of claim 10, wherein the photocatalytically active agent includes about 20 weight percent or less of the at least one additive, relative to a total weight of the photocatalytically active agent.

12. The coating material of claim 11, wherein the photocatalytically active agent includes between about 10 weight percent and about 1 weight percent of the at least one additive, relative to a total weight of the photocatalytically active agent.

13. The coating material of claim 12, wherein the photocatalytically active agent includes about 2.5 weight percent or more of at least one additive, relative to a total weight of the photocatalytically active agent.

14. The coating material of claim 13, wherein the photocatalytically active agent includes about 5 weight percent or more of the at least one additive, relative to a total weight of the photocatalytically active agent.

15. The coating material of claim 1, wherein the photocatalytically active agent comprises titanium dioxide in a form selected from the group consisting of amorphous form, partially crystalline form, and anatase form.

16. The coating material of claim 1, wherein the particles have a size and/or a surface roughness of about 1 μm or less.

17. The coating material of claim 16, wherein the particles have a size and/or a surface roughness of about 0.1 μm or less.

18. The coating material of claim 17, wherein the at least one filler includes one or more nano-fillers in the form of a highly-disperse silica.

19. The coating material of claim 18, wherein the highly-disperse silica consists of a silica gel.

20. The coating material of claim 19, wherein the silica gel is formed by precipitation using a sol gel process.

21. The coating material of claim 1, wherein the at least one filler includes a monomodal particle size distribution having a mean particle diameter of about 10 μm or less.

22. The coating material of claim 21, wherein the at least one filler includes a monomodal particle size distribution having a mean particle diameter of about 1 μm or less.

23. The coating material of claim 22, wherein the at least one filler includes a monomodal particle size distribution having a mean particle diameter of about 0.1 μm or less.

24. The coating material of claim 1, further comprising an excess of binding agent.

25. The coating material of claim 1, further comprising a selected one or more of a pigment, an accelerator, and a retarder.

26. The coating material of claim 1, further comprising a pigment distributor.

27. The coating material of claim 1, comprising about 20 weight percent of the binding agent and/or between about 5 and about 15 weight percent of the filler and/or between about 3 and about 8 weight percent of the photocatalytically active agent.

* * * * *